Figure 1:
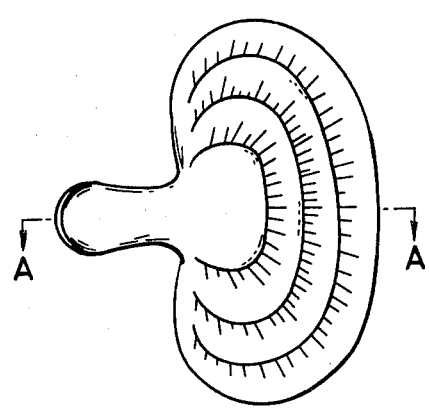

United States Patent [19]

Wada et al.

[11] Patent Number: 4,472,907

[45] Date of Patent: Sep. 25, 1984

[54] METHOD OF CULTIVATING *GANODERMA LUCIDUM* (FR.) KARST.

[75] Inventors: Toshihiko Wada; Akiyoshi Nakashima, both of Tokyo; Azuma Okubo, Tochigi; Yoshio Ohmura, Funabashi; Chikao Yoshikumi, Kunitachi, all of Japan

[73] Assignee: Kureha Kagaku Kogyo Kabushiki Kaisha, Nihonbashi, Japan

[21] Appl. No.: 423,103

[22] Filed: Sep. 24, 1982

[30] Foreign Application Priority Data

Sep. 30, 1981 [JP] Japan .............................. 56-155502

[51] Int. Cl.³ .......................................... A01G 1/04
[52] U.S. Cl. .................................................. 47/1.1
[58] Field of Search ........................................ 47/1.1

[56] References Cited

U.S. PATENT DOCUMENTS 3,292,305 12/1966 Stengel .
3,717,953 2/1973 Kuhn et al. .

OTHER PUBLICATIONS

The Collection, Cultivation and Utilization of Fungus (Jan. 1982), pp. 48–51.

*Primary Examiner*—Robert E. Bagwill
*Attorney, Agent, or Firm*—Wegner & Bretschneider

[57] ABSTRACT

A fruit body of *Ganoderma lucidum* (Fr.) Karst. having a long stipe is prepared by the method of the invention comprising the following steps;
 (a) cultivating a seed culture of a *Ganoderma lucidum* (Fr.) Karst. strain in an artificial solid medium to obtain a fungal tissue bed,
 (b) maintaining the fungal tissue bed at a humidity of at least 90% and an illumination intensity of at most 500 1X to form selectively a primordium of fruit body from the fungal tissue bed, and
 (c) maintaining the resulting culture at a humidity of from 40 to lower than 90% and an illumination intensity of at least 500 1X to form a fungal pileus of the fruit body from the primordium.

4 Claims, 6 Drawing Figures

METHOD OF CULTIVATING *GANODERMA LUCIDUM* (FR.) KARST.

The present invention relates to a method of cultivating *Ganoderm lucidum* (Fr.) Karst. in an artificial solid medium. In more detail, the invention relates to a method of cultivating *Ganoderm lucidum* (Fr.) Karst. to obtain a fruit body with a long fungal stipe in a short cultivation period and in a large amount.

*Ganoderm lucidum* (Fr.) Karst. is a basidiomycetes belonging to the genus *Ganoderma* of Polyporaceae, and it has been highly prized from ancient times as an ornamental mushroom and as a medicinal fungus. However, it only grows naturally and very rarely on aged trees in steep mountains. Recently, a method for artificially cultivating *Ganoderma lucidum* (Fr.) Karst. has been developed while utilizing the methods of artificially cultivating edible fungi. The artificial cultivation of the fungus is, however, extremely difficult due to unfavorable rooting since the physiological conditions of the fungus itself are different from those of the general edible fungi, for example, *Lentinus edodes* (Berk.) Singer, *Pleurotus ostreatus* (Fr.) Quël.

There is a method for cultivating *Ganoderma lucidum* (Fr.) Karst. by planting a seed fungus (spore) into a material wood as in the case of *Lentinus edodes* (Berk.) Singer (Japanese Patent Application Laying-Open No. 88628/80). This method is disadvantageous from the viewpoint of productivity, since it takes much labor in inoculation and control of culture and long times, for example, 120 to 150 days for cultivating, maturing and growing of fungi. In addition, the conventional methods for cultivating *Ganoderma lucidum* (Fr.) Karst. have given only fungi having short stipe and much curvature and ramification, and the resulting fungi are, therefore, entirely different from the naturally growing fungi having long stipe (Japanese Patent Publication No. 38092/80 and Japanese Patent Laying-Open No. 105445/75).

It is an object of the invention to provide a method for artificially cultivating *Ganoderma lucidum* (Fr.) Karst. in an artificial solid medium to obtain a fruit body having long stipe, i.e. *Ganoderma lucidum* (Fr.) Karst. closely resembling to those growing naturally, in short time period in a large amount.

The method of the invention comprises the following steps;

(a) cultivating a seed culture of a *Ganoderma lucidum* (Fr.) Karst. strain in an artificial solid medium to obtain a fungal tissue bed (hereinafter referred to as the step (a)), (b) maintaining the fungal tissue bed at a relative humidity of at least 90% and an illumination intensity of at most 500 1× to form selectively a primordium of fruit body from the fungal tissue bed (hereinafter referred to as the step (b)), and (c) maintaining the resulting culture at a humidity of at least 40 and lower than 90% and an illumination intensity of at least 500 1× to form a fungal pileus of the fruit body from the primordium (hereinafter referred to as the step (c)).

Figure 2:
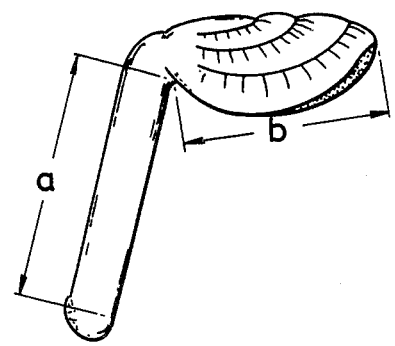
Figure 3:
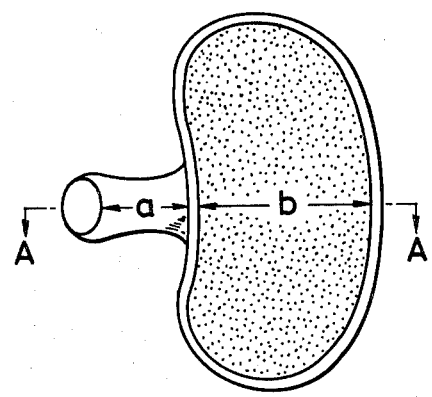
Figure 4:
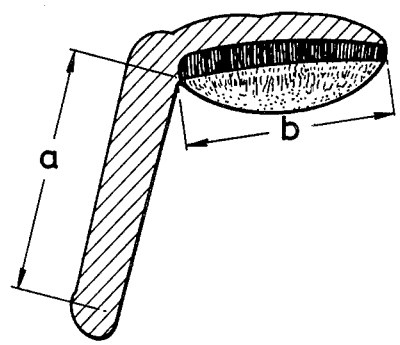
Figure 5:
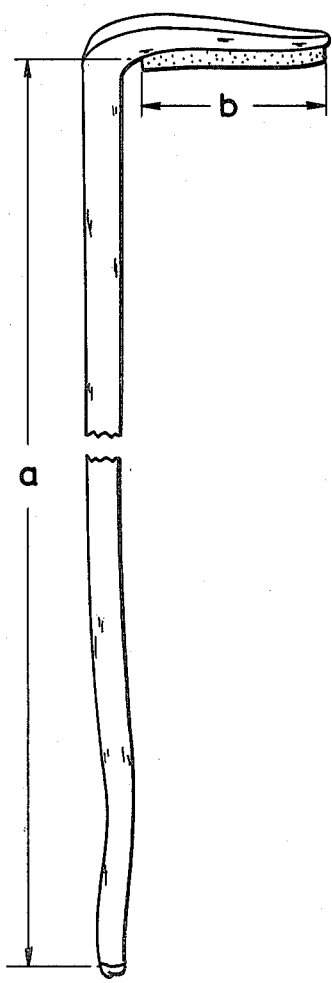
Figure 6:
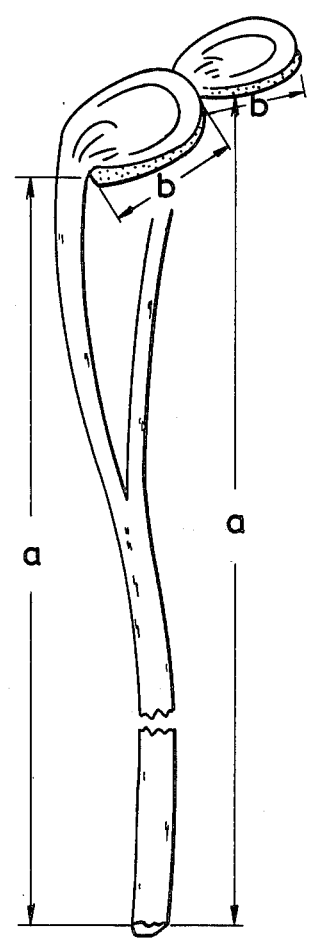

Of the drawings attached, FIG. 1 is a plan view of *Ganoderma lucidum* (Fr.) Karst. obtained by the conventional method, FIG. 2 is a side view of the fungus of FIG. 1, FIG. 3 is a back view of the fungus of FIG. 1, FIG. 4 is a cross-sectional view of the fungus of FIG. 1 along A—A, FIG. 5 is a side view of an example of *Ganoderma lucidum* (Fr.) Karst. obtained in the invention and FIG. 6 is a bird's eye view of another example of *Ganoderma lucidum* (Fr.) Karst. obtained in the invention.

The strain of *Ganoderma lucidum* (Fr.) Karst. for use in the method according to the invention is a purely separated strain collected in the natural world and separated by a conventional method, and in ordinary cases, it is aseptically slant- or plate cultured in an agar culture medium and stored at a low temperature. It is preferable to preserve the strain at a low temperature while transplanting to a new culture medium every 4 to 6 months or retain the activity of the hyphae (mycelia) for a long time while applying the method for preservation at a low temperature in laminated layers of paraffin to the first strain separated purely from the natural world. As the seed culture, the mycelia on the agar culture medium may be used as they are, however, in ordinary cases, the proliferated mycelia may be used, which mycelia may be obtained by inoculating the fungal strain to an artificial solid or liquid culture medium and cultivating the culture aseptically.

The seed culture used in the invention may be prepared in an artificial solid medium, for example by the following way.

Sawdust of a broad-leaved tree and rice bran are blended at a volume ratio of 4:1, and a suitable amount of water is added to the mixture to adjust the moisture content of the mixture to 60 to 70% by weight. After pushing the mixture into sterilized glass bottles and plugging the opening of the bottle with cotton wool with 3 holes for inoculation, the bottles are subjected to sterilization for the preparation of the solid medium in the bottle. Then, the aseptically proliferated mycelia on the agar culture medium is inoculated to the solid medium together with the agar piece. By cultivating the inoculated culture medium for about 20 days at about 25° C., the seed culture comprising mycelia of *Ganoderma lucidum* (Fr.) Karst. proliferated throughout the solid medium is obtained.

The step (a) of cultivation in the invention is a step of preparation of the fungal tissue bed suitable for the cultivation steps (b) and (c). In the step (a), the seed culture e.g. prepared above is inoculated into the artificial solid medium and cultivated at a relative humidity of 40 to 80%, preferably 50 to 70% and at a temperature of 15° to 35° C., preferably 20° to 25° C. Usually, within about 20 to 30 days, the mycelia spreads throughout the culture medium, and a fungal tissue bed having mature rhizomorph on its upper surface is obtained. As the base material of the artificial solid medium of the invention, sawdust, rice bran, chaff, soya bean cake, bran, and the like may be used singly or as their mixture. In addition, a mixture of at least one of the base material and a covering material to be explained later may be used.

The artificial solid medium is prepared by pressing a mixture of at least one of the base material and water together in a vessel such as glass bottle, plastic bottle and bug and sterilizing the pressed material. The mixing ratio of the base material and water is usually 1:1.6 to 1:2 by weight. In the cases of preparing the solid medium, a carbon source such as glucose, maltose and the like, a nitrogen source such as yeast extract, pepton and the like, a pH-adjusting agent such as calcium carbonate, vitamins, inorganic salts as well as growth-promoting agents may be added thereto. A mixture of 2 to 6 parts by weight of sawdust and 1 part by weight of rice bran is a preferable base material containing various nutrient components in suitable amounts and ratios. As the sawdust, those derived from a broad-leaved tree such as beech, oak, walnut and the like are preferably used, however, those derived from a coniferous three such as pine, cryptomeria, Japanese hemlock and the like may be used.

During the step (a) of cultivation, illumination is not always necessary, however, an illumination of an optional strength may be harmless.

The step (b) of cultivation is a step for inducing the rhizomorph in the fungal tissue bed to form the primordium of fruit body (stipe). In the step (b), the fungal tissue bed is cultivated at a temperature of 15° to 40° C., preferably 25° to 35° C. and at a relative humidity of at least 90%, preferably at least 95% under an illumination intensity of at most 500 1×, preferably 100 to 300 1×. In this case, it is preferable to cover the fungal tissue bed with a covering material cited later. Under such conditions, the primordium of fruit body begins to form within about 10 to 15 days and continues to grow.

Covering of the fungal tissue bed improves the retention of moisture in the bed to prevent the drying of the bed and also improves the heat-insulation resulting in promoting the active proliferation of the mycelia. Accordingly, covering of the bed is carried out to cover the bed well. In addition, it is not necessary to cover the upper surface of the bed, that is, the surface where the primordium grows, however, in order to promote the primordium growth, the covering is preferably carried out to the extent that it covers the rhizomorph of the bed. As the covering material, natural soil such as sand, loamy soil and the like, a soil-improving agent such as vermiculite, perlite and the like or rice straw, buckwheat chaff, or the like may be used. Kanuma-soil and Akadama-soil are the particularly preferable covering material from the viewpoints of moisture-retention and ventilation. The covering material is not necessarily sterilized particularly, in cases where it is clean.

The duration of the step (b) for cultivation depends on the desired length of the stipe of fruit body, and it takes ordinarily about 30 to 45 days.

The step (c) for cultivation has a role of forming a fungal pileus from the primordium of the fruit body. In the step (c), cultivation is carried out by altering the conditions of cultivation a little, i.e., at the same temperature of 15° to 40° C., preferably 25° to 35° C., however, at a relatively humidity of at least 40 and less than 90%, preferably, 60 to 80% under an illumination of at least 500 1×, ordinarily, 600 to 5000 1×. A fungal pileus is formed within about 10 to 30 days.

In addition, it is preferable to keep the moisture content of the fungal tissue bed during the cultivation steps (b) and (c) at 65 to 75% by weight. As has been described, the cultivation from the step (a) to the step (c) is completed in about 60 to 100 days.

The method for cultivation of the invention may be executed indoors, under a controllable artificial illumination, however, it may be carried out in a vinyl house and in a glass house if a suitable control of illumination can be applied.

The culture is preferably illuminated by natural light or incandescent electrical lamp.

The method for cultivation of *Ganoderma lucidum* (Fr.) Karst. according to the present invention is a method wherein the environmental conditions are changed in accordance with the growing course of the fruit body of the fungus to carry out the selective cultivation of the fungus, and according to the method of the present invention, it is possible to cultivate the fungus of the naturally generated type, particularly, with the long stipe of the fruit body thereof.

Hitherto, the fruit body of the natural strain of *Ganoderma lucidum* (Fr.) Karst. has ordinarily a pileus and a stipe, and the pileus is ordinarily reniform or quasicircular in shape, for instance, those shown in FIGS. 1 to 4. As is seen in FIG. 4, the ratio of the length of the stipe (a) to the diameter of the pileus (b) is ordinarily in the range of 1 to 1.5 (a/b=1 to 1.5).

On the other hand, in the fruit body of the fungus obtained by the method according to the present invention, the ratio is higher than 2, and according to the suitable selection of the conditions of cultivation, it is easy to obtain the fruit bodies having the ratio a/b of 3 to 15, in other words, those fruit bodies having an extremely longer stipe than that of the naturally growing fruit body, for instance, those shown in FIGS. 5 and 6 can be easily obtained.

Such fruit bodies with extremely long stipe are highly valuable objects as they are or after being bottled for ornamental or medicinal purposes and as luxuary food or food for health. In addition, according to the present invention, by optionally selecting the duration period of the steps (b) and (c) for cultivation, it is easy to obtain a fruit body with an optional ratio of the length of the stipe to the diameter of the pileus. Moreover, according to the method of the present invention, as are clearly seen in Examples, it is possible to obtain the fruit bodies of the fungus larger in dried weight than the fruit bodies of the same fungus obtained by the conventional methods.

The present invention will be explaind concretely more in detail while reffering to the following non-limiting examples.

EXAMPLE 1

Into a mixture of 2000 g of sawdust of broad-leaved trees, 900 g of rice bran and 50 g of calcium carbonate, 4700 ml of water was added, and the aqueous mixture was well stirred to prepare an uniform culture medium. After pressing the thus prepared culture medium into large-necked polypropylene bottles in an amount of 500 to 600 g, making a vertical and tubular passage of 10 mm in diameter in the center part of the pressed culture medium and plugging the bottle with a cotton wool or polyurethane, the bottles were subjected to sterilization under a pressure. Into the thus prepared culture medium, a seed culture of a strain CM-359 (deposited at Fermentation Research, Institute, Japanese Government, under the deposit Index of FERM-P No. 6060 corresponding to FERM BT-179 under Budapest Treaty) of *Gonoderma lucidum* (Fr.) Karst. was inoculated and cultivation was carried out as follows: The temperature was kept at 25° C. at the relative humidity of 50% for 20 days under dark condition. Then the plug was removed, and Akadama soil to which water had been fully absorbed was filled into the polypropylene bottle upto its opening, and the bottles were transferred to the place where the temperature was kept at 30° C. at a relative humidity of 99% with an illumination intensity of 200 1× to obtain lean and tall primordia of the fruit body after 40 days. Then, the bottles with these primordia were transferred to the place wherein the temperature was kept at 30° C. at a relative humidity of 70% with an illumination intensity of 600 1×. After keeping the bottles under these conditions for 15 days, small-sized pilei of the fruit bodies were formed, and favorable fruit bodies blackish brown in colour could be collected with the average dried weight of 20 g per 600 g of each fungal tissue bed, of about 21 cm (a) in length and about 3 cm (b) in diameter of the cap., i.e., a/b=about 7. The thus obtained fruit body had, as is shown in FIG. 5, a long stipe and resembled to the naturally generated ones.

EXAMPLE 2

Culture medium was prepared by blending 4000 g of sawdust of broad-leaved trees, 1000 g of rice bran and 50 g of calcium carbonate with 9000 ml of water, and after pouring 900 g of the culture medium into a polypropylene bag, the bag was strongly pressed to form a block of culture medium while inserting a rod of 10 mm in diameter into the central part of the bag for making a thin cylindrical space in the solidified culture medium, and the bag containing the culture medium was subjected to steam-pressured sterilization under a steam pressure of 1 kg/cm$^2$, at 120° C. for 60 min. After leaving for cooling, the seed culture prepared separately as in Example 1 on sawdust was inoculated into the cylindrical space of the solid culture medium in the bag aseptically, and cultivation was carried out as follows. The solid medium was cultivated in a dark place at 23° C. and at a relative humidity of 50% for 25 days to prepare the fungal tissue bed wherein vegetative propagation of mycelia predominated. Then, the fungal tissue bed was taken out from the polypropylene bag and buried into Akadama soil to which water was fully absorbed, and the soil with the bag was kept at 30° C. at a relative humidity of 99% for 45 days with an illumination intensity of 150 1× to find two slender primordia of fruit body out from the fungal tissue bed in length of about 20 cm. Then, in order to induce the formation of the pilei, the environmental conditions were changed as follows: relative humidity from 99 to 70%, illumination intensity from 150 to 700 1×, however, the temperature being retained at 30° C. Under these conditions, the covering soil was slightly dried and the moisture therein was replaced with air. The apexes of the primordia showed swelling and on the 15th day, the swellings became pilei. Thus, two pilei were formed with the respective diameter of 2 and 3 cm (a/b=7 to 10).

The thus obtained fruit bodies of *Ganoderma lucidum* (Fr.) Karst. were, as is seen in FIG. 6, very close in appearance to the naturally grown fruit body of the same species as those in Example 1 with a yield of dried matter of 30 g per 900 g of the fungal tissue bed.

EXAMPLE 3

Culture medium was prepared by mixing 5500 ml of water to a mixture of 2000 g of sawdust of broad-leaved trees, 900 g of rice bran, 50 g of calcium carbonate and 1000 g of Kanuma-soil, and 1000 to 1200 g of the thus prepared culture medium was filled into a gazette bag made of polypropylene and after shaping in a block, as in Example 1, it was subjected to sertilization under a steam pressure to be solid culture medium. After inoculating the same seed culture as those in Examples 1 and 2 to the thus prepared solid culture medium, the culture medium was cultivated at 25° C. and at a relatively humidity of 50% for 20 days. Then, the fungal tissue bed was taken out of the gazette bag, and after soaking into cold water for 8 hours to make the bed fully absorb water, the bed was controlled under the conditions of temperature at 30° C. and at a relative humidity of 99% with an illumination intensity of 400 1× for about 30 days resulting in the formation of primordia of fruit body. Then the culture was treated at 30° C. and at a relative humidity of 75% with an illumination intensity of 750 1× for about 20 days, the fruit bodies with opened pilei were obtained. As is seen in Example 3, by using a base material containing soil, the formation of fruit body seemed to be accelerated a little as compared to Examples 1 and 2. In Example 3, the yield of fruit body was 20 g of dried body per 1000 g of the fungal tissue bed.

COMPARATIVE EXAMPLE

Culture medium was prepared by adding 4700 ml of water to a mixture of 2000 g of sawdust of broad-leaved trees, 900 g of rice bran and 50 g of calcium carbonate and blending the aqueous mixture, and 600 g of the thus prepared culture medium was filled into a widemouthed bottle made of polypropylene and after plugging the bottle, it was subjected to sterilization under a steam pressure.

The seed culture separately prepared as in Example 1 was inoculated to the culture medium in the bottle, and the bottle was subjected to cultivation at 18° to 20° C. for 25 days at a relative humidity of about 60%. Then, after removing the plug, cultivation was continued at 25° C. and at a relative humidity of 85% under an illumination intensity of 600 1× to obtain fruit bodies as that shown in FIGS. 1 to 4. This method for cultivation is one of the conventional methods generally adopted hitherto. The yield of the dry fruit body was 15 g/600 g of the fungal tissue bed and was smaller than that in Example 1, and the shape of the fruit body was the same as those shown in FIGS. 1 to 4, of short stipe and broad pileus with the ratio of a/b of 1.2.

What is claimed is:

1. A method of cultivating *Ganoderma lucidum* (Fr.) Karst. for obtaining a fruit body having a long stipe, comprising the following steps;
    (a) cultivating a seed culture of a *Ganoderma lucidum* (Fr.) Karst. strain in an artificial solid medium to obtain a fungal tissue bed,
    (b) maintaining the fungal tissue bed at a humidity of at least 90% and an illumination intensity of at most 500 1× to form selectively a primordium of fruit body from the fungal tissue bed, and
    (c) maintaining the resulting culture at a humidity of from 40 to lower than 90% and an illumination intensity of at least 500 1× to form a fungal pileus of the fruit body from the primordium.

2. The method of claim 1, wherein the step (a) is carried out under the condition of a temperature of 15° to 35° C. and a humidity of 40 to 80%.

3. The method of claim 1 or 2, wherein the step (b) is carried out under the condition of a temperature of 15° to 40° C., a humidity of at least 95% and an illumination intensity of 100 to 300 1×.

4. The method of claim 1, wherein the step (c) is carried out under the condition of a temperature of 15° to 40° C., a humidity of 60 to 80% and an illumination intensity of 600 to 5000 1×.

* * * * *